United States Patent
Cocagne

(10) Patent No.: US 10,972,541 B1
(45) Date of Patent: *Apr. 6, 2021

(54) PRIORITY ENCODED DATA SLICE RETENTION

(71) Applicant: Pure Storage, Inc., Mountain View, CA (US)

(72) Inventor: Thomas D. Cocagne, Elk Grove Village, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,668

(22) Filed: Aug. 22, 2019

Related U.S. Application Data

(63) Continuation of application No. 15/842,560, filed on Dec. 14, 2017, now Pat. No. 10,432,726, which is a continuation-in-part of application No. 15/839,814, filed on Dec. 12, 2017, now Pat. No. 10,051,057, which is a continuation-in-part of application No. 15/673,978, filed on Aug. 10, 2017, now Pat. No. 10,015,255, which is a continuation of application (Continued)

(51) Int. Cl.
*H04L 1/00* (2006.01)
*H04L 29/08* (2006.01)
*G06F 11/10* (2006.01)

(52) U.S. Cl.
CPC ...... *H04L 67/1097* (2013.01); *G06F 11/1092* (2013.01); *G06F 2211/1028* (2013.01)

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Mujtaba M Chaudry
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device detects a total number of errors that is associated with a set of memory devices of one or more sets of storage units (SUs) within a DSN that distributedly store a set of encoded data slices (EDSs). When the total number of errors compares unfavorably to a priority error threshold level, the computing device indicates that a minimum number of error-free EDSs are available of the set of EDSs. The computing device also selects a mechanism for data retention process from a plurality of mechanisms for data retention process and executes it.

20 Claims, 7 Drawing Sheets

Related U.S. Application Data

No. 14/876,154, filed on Oct. 6, 2015, now Pat. No. 9,774,684, and a continuation-in-part of application No. 14/792,577, filed on Jul. 6, 2015, now Pat. No. 9,354,974, which is a continuation of application No. 13/863,475, filed on Apr. 16, 2013, now Pat. No. 9,092,140, which is a continuation of application No. 12/797,025, filed on Jun. 9, 2010, now Pat. No. 8,595,435, said application No. 13/863,475 is a continuation-in-part of application No. 12/080,042, filed on Mar. 31, 2008, now Pat. No. 8,880,799, which is a continuation-in-part of application No. 11/973,542, filed on Oct. 9, 2007, now Pat. No. 9,996,413, and a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937.

(60) Provisional application No. 62/086,611, filed on Dec. 2, 2014, provisional application No. 61/230,038, filed on Jul. 30, 2009.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,346,751 | B2 | 3/2008 | Prahlad et al. |
| 7,469,325 | B2 | 12/2008 | Shibayama et al. |
| 7,636,724 | B2 | 12/2009 | de la Torre et al. |
| 8,532,212 | B2 * | 9/2013 | Ito ................. H04B 7/0452 375/267 |
| 8,788,878 | B2 | 7/2014 | Kaushik et al. |
| 8,892,598 | B2 * | 11/2014 | Motwani ............ H04L 9/3242 707/770 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0311068 | A1 * | 12/2012 | Gladwin ............ H04L 67/1097 709/214 |
| 2014/0351624 | A1 * | 11/2014 | Resch ............... G06F 11/0727 714/6.2 |
| 2016/0154698 | A1 * | 6/2016 | Kazi ................ G06F 3/0619 714/766 |
| 2016/0188218 | A1 * | 6/2016 | Gray ................ G06F 11/1092 711/165 |
| 2016/0239384 | A1 * | 8/2016 | Slik ................. H04L 67/1097 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

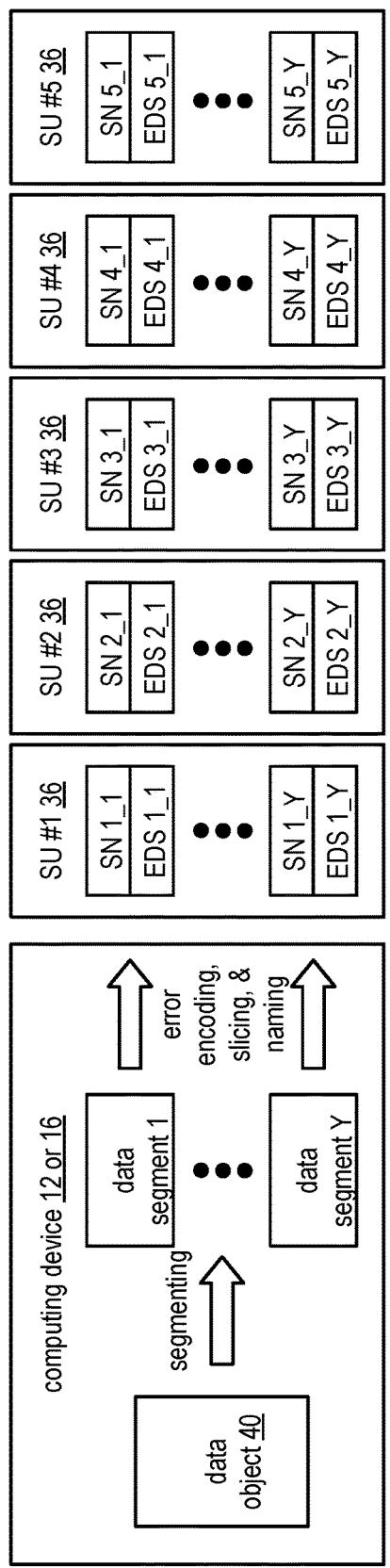

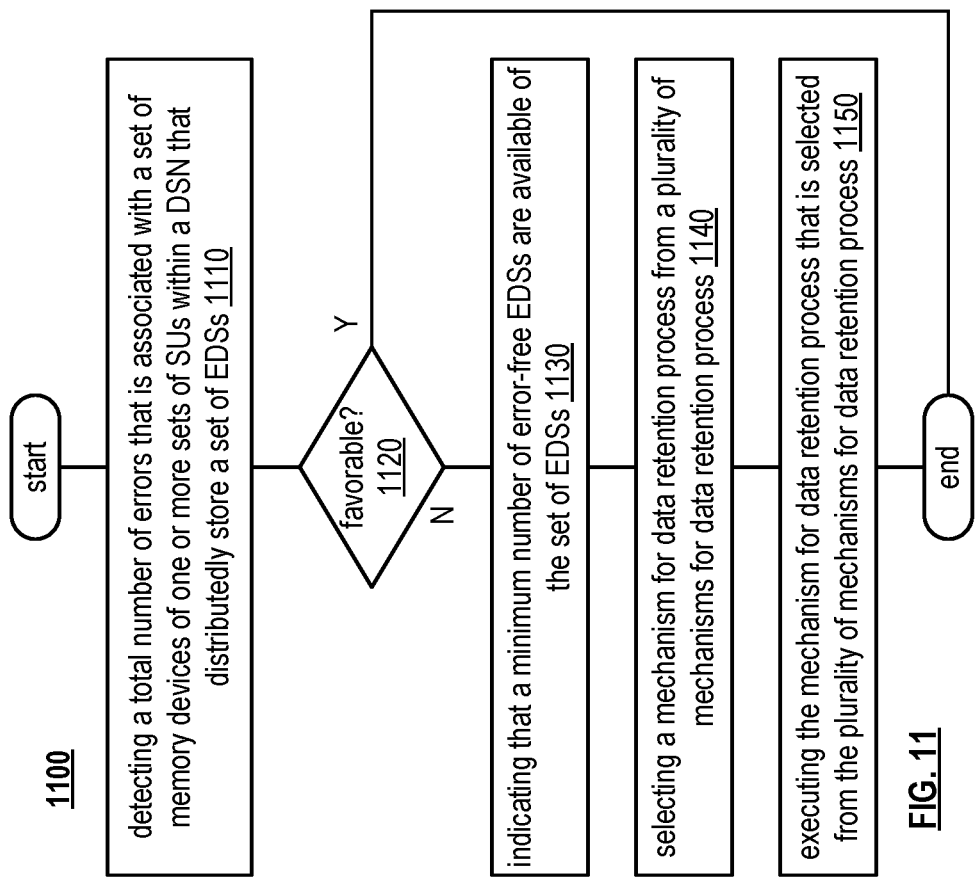

PRIORITY ENCODED DATA SLICE RETENTION

CROSS REFERENCE TO RELATED PATENTS

The present U.S. Utility Patent Application claims priority pursuant to 35 U. S.C. § 120 as a continuation of U.S. Utility patent application Ser. No. 15/842,560, entitled "LAST-RESORT OPERATIONS TO SAVE AT-RISK-DATA," filed Dec. 14, 2017, pending, which claims priority pursuant to 35 U.S.C. § 120 as a continuation-in-part (CIP) of U.S. Utility patent application Ser. No. 15/839,814, entitled "PRIORITIZING READ LOCATIONS BASED ON AN ERROR HISTORY," filed Dec. 12, 2017, issued as U.S. Pat. No. 10,051,057 on Aug. 14, 2018, which claims priority pursuant to 35 U.S.C. § 120 as a continuation-in-part (CIP), of U.S. Utility patent application Ser. No. 15/673,978, entitled "STORING DATA IN A DISPERSED STORAGE NETWORK," filed Aug. 10, 2017, issued as U.S. Pat. No. 10,015,255 on Jul. 3, 2018, which claims priority pursuant to 35 U.S.C. § 120 as a continuation of U.S. Utility application Ser. No. 14/876,154, entitled "STORING DATA IN A DISPERSED STORAGE NETWORK," filed Oct. 6, 2015, issued as U.S. Pat. No. 9,774,684 on Sep. 26, 2017, which claims priority pursuant to 35 U. S.C. § 119(e) to U.S. Provisional Application No. 62/086,611, entitled "MAINTAINING DATA INTEGRITY IN A DISPERSED STORAGE NETWORK" filed Dec. 2, 2014, all of which are hereby incorporated herein by reference in their entirety and made part of the present U.S. Utility Patent Application for all purposes.

U.S. Utility application Ser. No. 14/876,154 also claims priority pursuant to 35 U.S.C. § 120 as a continuation-in-part (CIP) of U.S. Utility application Ser. No. 14/792,577, entitled "DISPERSED STORAGE WRITE PROCESS," filed Jul. 6, 2015, issued as U.S. Pat. No. 9,354,974 on May 31, 2016, which is a continuation of U.S. Utility application Ser. No. 13/863,475, entitled "DISPERSED STORAGE WRITE PROCESS," filed Apr. 16, 2013, issued as U.S. Pat. No. 9,092,140 on Jul. 28, 2015, which is a continuation of U.S. Utility application Ser. No. 12/797,025, entitled "DISPERSED STORAGE WRITE PROCESS," filed Jun. 9, 2010, issued as U.S. Pat. No. 8,595,435 on Nov. 26, 2013, which claims priority pursuant to 35 U.S.C. § 119(e) to U.S. Provisional Application No. 61/230,038, entitled "DISPERSED STORAGE NETWORK VERSION SYNCHRONIZATION," filed Jul. 30, 2009, all of which are hereby incorporated herein by reference in their entirety and made part of the present U.S. Utility Patent Application for all purposes.

U.S. Utility application Ser. No. 13/863,475 also claims priority pursuant to 35 U.S.C. § 120 as a continuation-in-part (CIP) patent application of U.S. Utility application Ser. No. 12/080,042, entitled, "REBUILDING DATA ON A DISPERSED STORAGE NETWORK," filed Mar. 31, 2008, issued as U.S. Pat. No. 8,880,799 on Nov. 4, 2014, which is a continuation-in-part (CIP) of U.S. Utility application Ser. No. 11/973,542, entitled "ENSURING DATA INTEGRITY ON A DISPERSED STORAGE GRID," filed Oct. 9, 2007, issued as U.S. Pat. No. 9,996,413 on Jun. 12, 2018; and is a continuation-in-part (CIP) of U.S. Utility application Ser. No. 11/403,391, entitled "SYSTEM FOR REBUILDING DISPERSED DATA," filed Apr. 13, 2006, issued as U.S. Pat. No. 7,546,427 on Jun. 9, 2009, which is a continuation-in-part (CIP) of U.S. Utility application Ser. No. 11/241,555, entitled "SYSTEMS, METHODS, AND APPARATUS FOR SUBDIVIDING DATA FOR STORAGE IN A DISPERSED DATA STORAGE GRID," filed Sep. 30, 2005, issued as U.S. Pat. No. 7,953,937 on May 31, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide acceptable means to preserve data when it may become at or near being unrecoverable. For example, various components within a data storage system may fail, and the prior art does not provide acceptable means to take appropriate actions to ensure that data associated therewith is not lost.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 11 is a diagram illustrating an embodiment of a method for execution by one or more computing devices in accordance with the present invention.

DETAILED DESCRIPTION OF THE INVENTION

Figure 1:
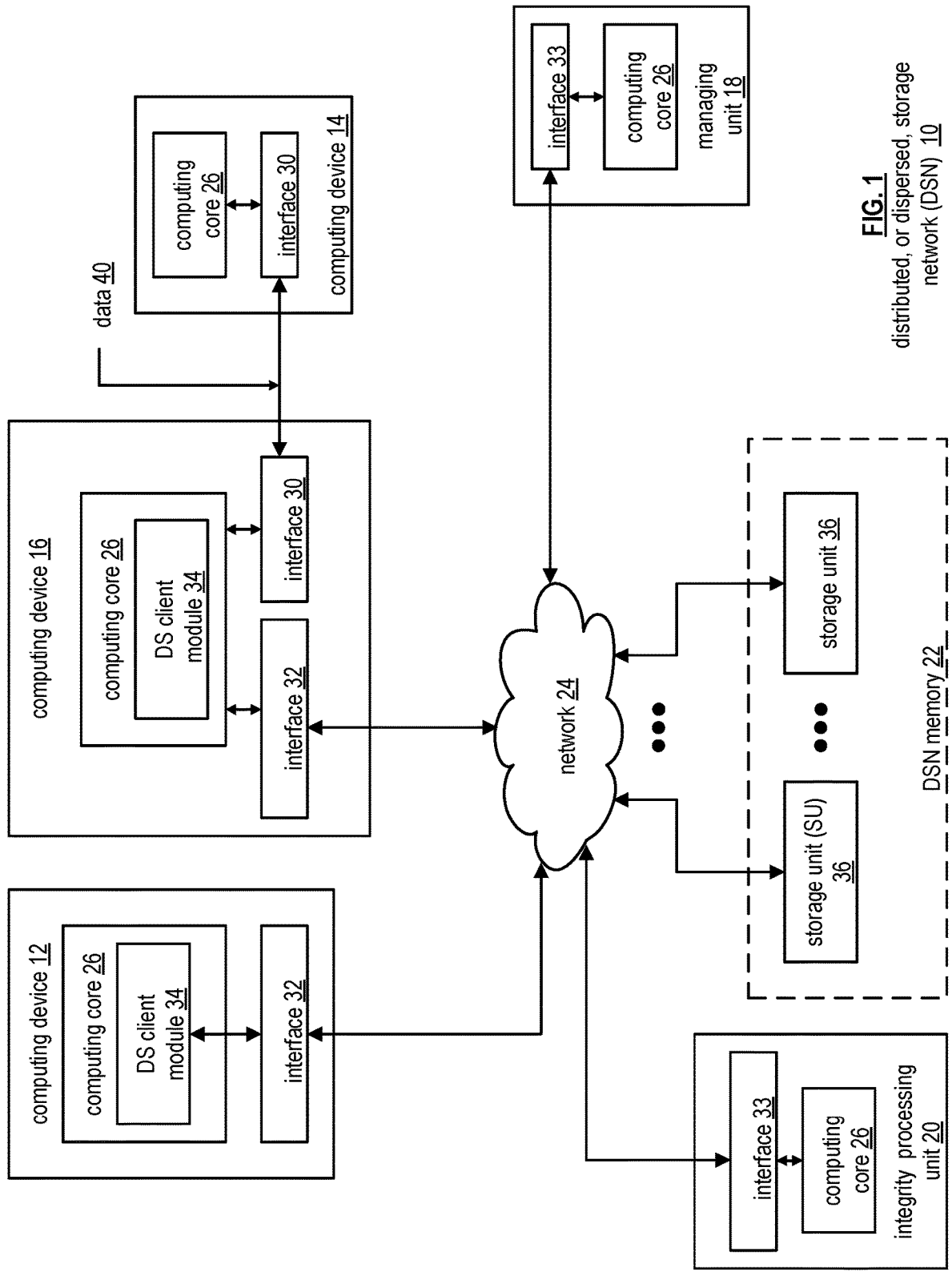
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
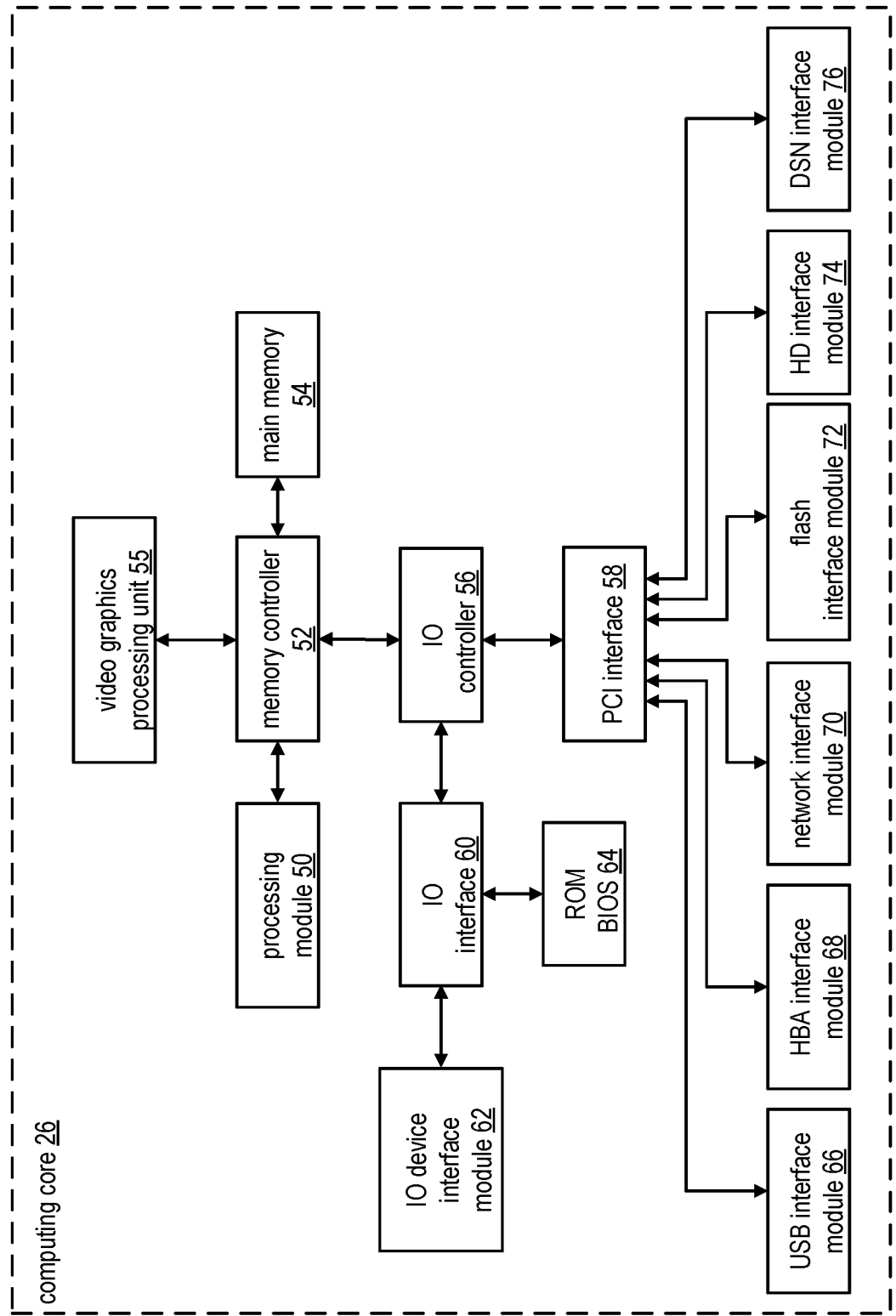
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
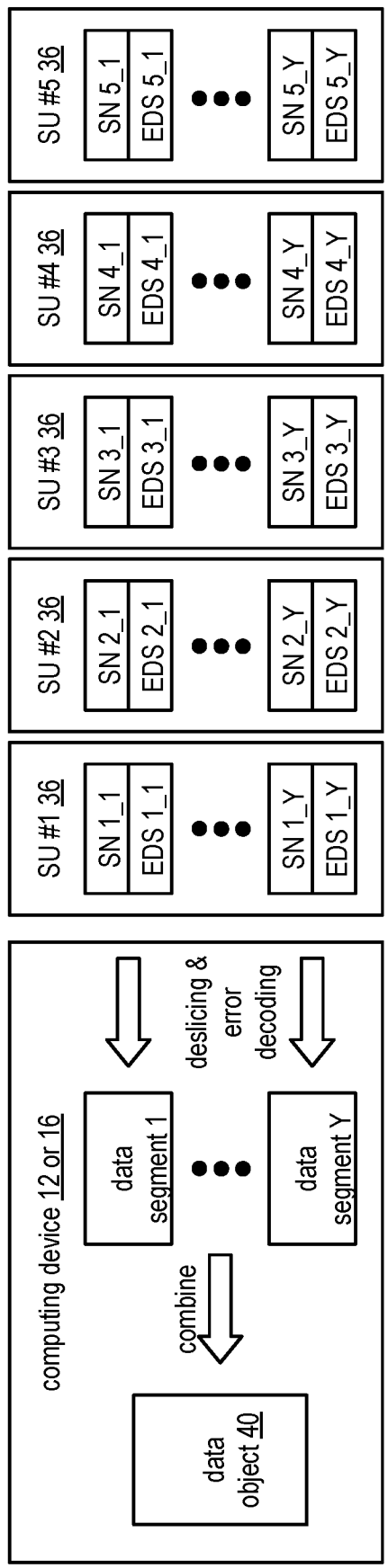
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
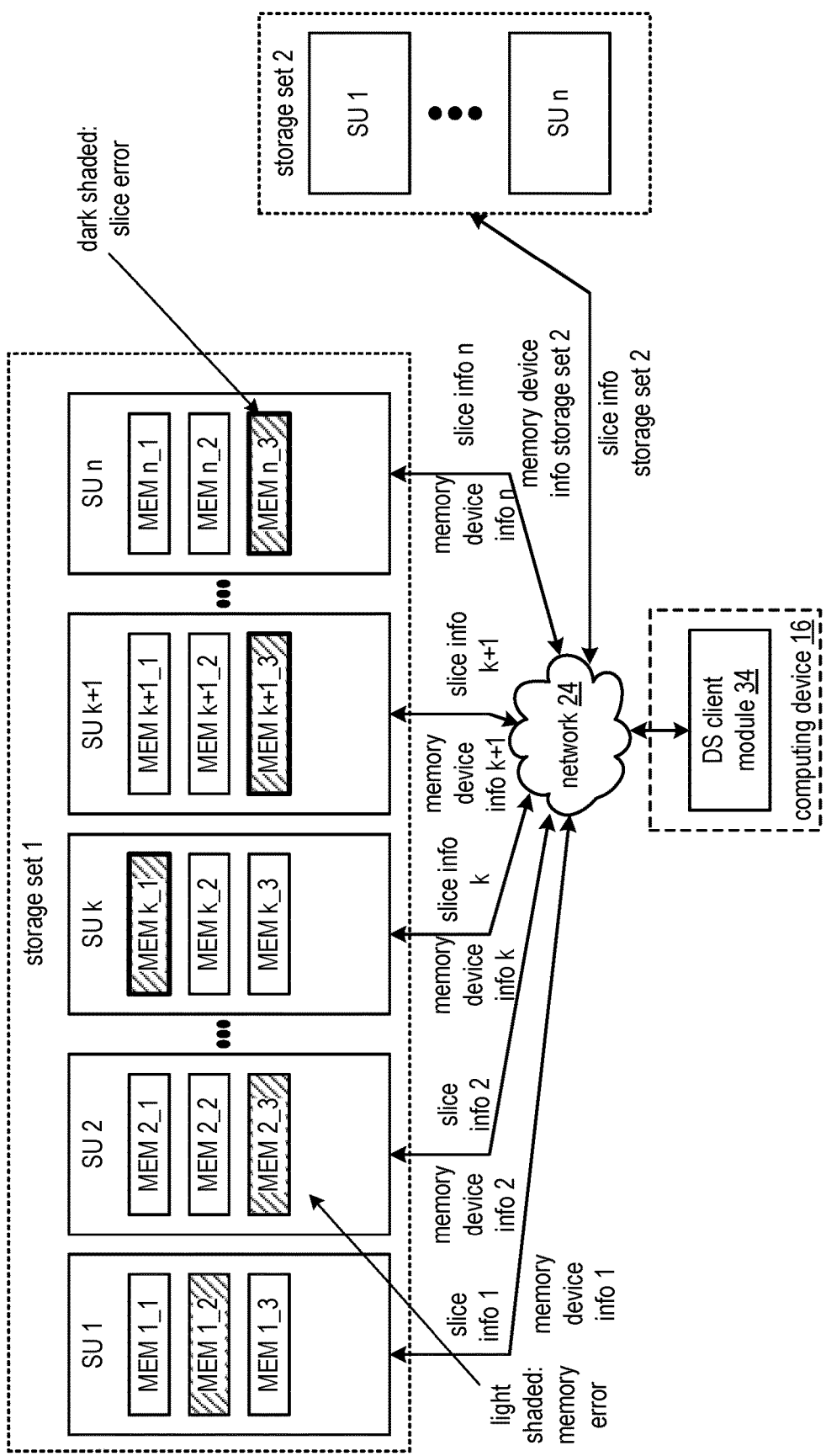
FIG. 9 is a schematic block diagram of an embodiment of a dispersed or distributed storage network (DSN) in accordance with the present invention.

FIG. 9 is a schematic block diagram of an embodiment of a dispersed or distributed storage network (DSN) in accordance with the present invention. This diagram includes a schematic block diagram of another embodiment of a dispersed storage network that includes one or more storage sets 1-2, the network 24 of FIG. 1, and the distributed storage (DS) client module 34 of FIG. 1 and/or computing device 16 of FIG. 1. Note that such operations, functions, etc. as described herein as being performed by such a DS client module 34 may alternatively be performed by computing device 16. Each storage set includes a set of storage units (SUs) 1-n. Each SU includes a plurality of memory devices, where each memory device is associated with a set of memory devices of the set of SUs. Each set of memory devices is associated with a unique dispersed storage network (DSN) address range corresponding (e.g., common for each memory device of the set of memory devices). For example, each SU includes a first memory device that is associated with a first common DSN address range, a second memory device that is associated with a second common DSN address range, and a third memory device that is associated with a third common DSN address range. Each SU may be implemented utilizing the SU 36 of FIG. 1. The DSN functions to prioritize rebuilding of encoded data slices, where the one or more storage sets mirror stored data when at least two storage sets are utilized.

In an example of operation of the prioritizing of the rebuilding of the encoded data slices, the DS client module 34 detects a total number of errors for a set of memory devices, where the total number of errors includes at least one of a memory error associated with a memory device of the set of memory devices and a slice error associated with storage of an encoded data slice of a set of encoded data slices previously stored in the set of memory devices. For example, the DS client module 34 receives, via the network 24, memory device information and slice information from at least some of the SUs of at least one of the storage sets. For instance, the DS client module 34 detects one slice error for a first set of memory devices for a total number of errors of 1, detects one memory error for a second set of memory devices for a total number of errors of 1, and detects one memory error and two slice errors for a third set of memory devices for a total number of errors of 3.

When the total number of errors compares unfavorably to a priority error threshold level, the DS client module 34 indicates that a minimum number of error-free slices are available of the set of encoded data slices. For example, the DS client module 34 indicates that a minimum number of 10 error-free slices are available of the third set of encoded data slices when the total number of errors is six and the priority error threshold level is six when a decode threshold level k=10 and an information dispersal algorithm (IDA) width n=16.

When the minimum number of error-free slices are available of the set of encoded data slices, the DS client module 34 initiates a corresponding priority data retention process. The initiating includes selecting a mechanism of the data retention process and executing the mechanism. The selecting of the mechanism may be based on one or more of a number of available slices, a data type indicator, a data priority indicator, a data owner identifier, a predetermination, a request, and interpreting a portion of a system registry.

A first mechanism includes recovering a data segment, encoding additional encoded data slices, and storing the additional encoded data slices. A second mechanism includes recovering the data segment, rebuilding encoded data slices of slice errors, and storing the rebuilt encoded data slices. A third mechanism includes recovering the data segment, encoding the data segment to produce a copy of the set of encoded data slices, and storing the set of encoded data slices in another set of storage units. A fourth mechanism includes recovering encoded data slices of slice errors from another set of storage units and storing a copy of the set of encoded data slices. A fifth mechanism includes temporarily suspending slice access to the set of memory devices and prioritizing rebuilding of the encoded data slices of the slice errors.

In an example of operation and implementation, a computing device includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16 of FIG. 1, FIG. 9, and/or any other diagram, example, embodiment, equivalent, etc. as described herein) is configured to detect a total number of errors that is associated with a set of memory devices of one or more sets of storage units (SUs) within the DSN that distributedly store a set of encoded data slices (EDSs). Note that a data object is segmented into a plurality of data segments, and a data segment of the plurality of data segments is dispersed error encoded in accordance with dispersed error encoding parameters to produce the set of encoded data slices (EDSs). When the total number of errors compares unfavorably to a priority error threshold level, the computing device is also configured to indicate that a minimum number of error-free EDSs are available of the set of EDSs. The computing device is also configured to select a mechanism for data retention process from a plurality of mechanisms for data retention process and execute the mechanism for data retention process that is selected from the plurality of mechanisms for data retention process.

In some examples, the total number of errors includes a memory error associated with a memory device of the set of memory devices and/or a slice error associated with storage of an EDS of the set of EDSs that is stored in the set of memory devices of the one or more SUs within the DSN.

Also, in some examples, the computing device is further configured to select the mechanism for the data retention process based on a number of available EDSs, a data type indicator, a data priority indicator, a data owner identifier, a predetermination, a request, and/or an interpretation of a portion of a system registry.

Also, note that the plurality of mechanisms for data retention process includes one or more of the following mechanisms: a first mechanism that includes recovering the data segment, encoding the data segment in accordance with the dispersed error encoding parameters or other dispersed error encoding parameters to produce additional EDSs, and storing the additional EDSs within the one or more sets of SUs within the DSN; a second mechanism that includes recovering the data segment, rebuilding at least one EDS associated with a slice error to generate a rebuilt EDS, and storing the rebuilt EDS within the one or more sets of SUs within the DSN; a third mechanism that includes recovering the data segment, encoding the data segment in accordance with the dispersed error encoding parameters or other dispersed error encoding parameters to produce to produce a copy of the set of EDSs, and storing the copy of the set of EDSs in another set of SU of the one or more sets of SUs within the DSN; a fourth mechanism that includes recovering EDSs associated with slice errors from another set of SUs, and storing another copy of the set of EDS within the one or more sets of SUs within the DSN; and/or a fifth mechanism that includes temporarily suspending access to the set of memory devices and prioritizing rebuilding of EDSs within the set of EDSs associated with slice errors.

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

Figure 10:
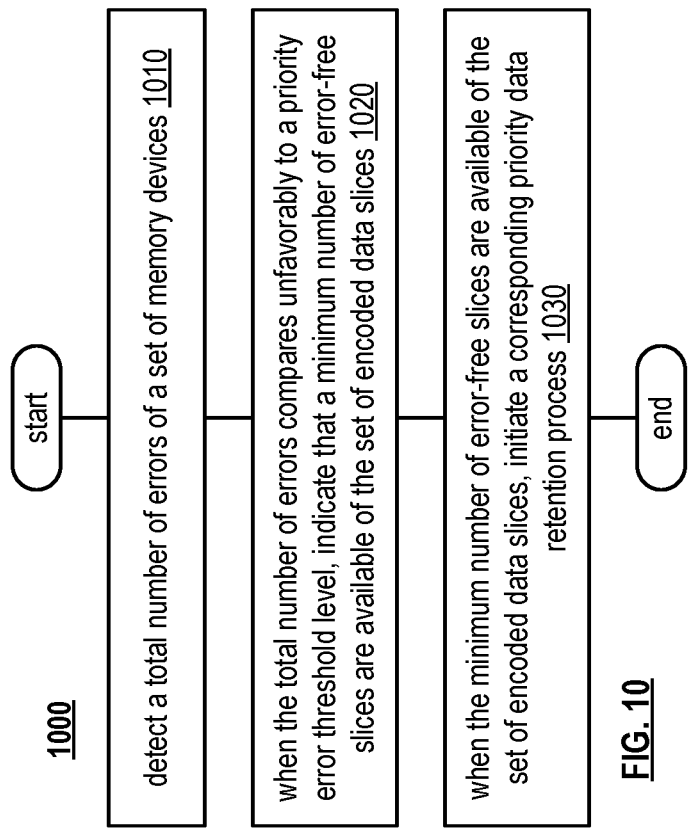
FIG. 10 is a flowchart illustrating another example of prioritizing rebuilding of encoded data slices in accordance with the present invention.

FIG. 10 is a flowchart illustrating another example of prioritizing rebuilding of encoded data slices in accordance with the present invention. This diagram includes a flowchart illustrating another example of prioritizing rebuilding of encoded data slices. The method 1000 begins or continues at a step 1010 where a processing module (e.g., of a distributed storage (DS) client module) detects a total number of errors of a set of memory devices, where the total number of errors includes memory errors and slice errors. The detecting includes at least one of initiating a query, receiving a query response, and interpreting an error message.

When the total number of errors compares unfavorably to a priority error threshold level, the method 1000 continues at the step 1020 where the processing module indicates that a minimum number of error-free slices are available of the set of encoded data slices. For example, the processing module compares the total number of errors to the priority error threshold level and indicates unfavorable when the number of errors is greater than the priority error threshold level (e.g., threshold level of n-k-1).

When the minimum number of error-free slices are available of the set of encoded data slices, the method 1000 continues at the step 1030 where the processing module initiates a corresponding priority data retention process. The initiating includes selecting a mechanism of the data retention process and facilitating initiation of the execution of the selected mechanism.

FIG. 11 is a diagram illustrating an embodiment of a method 1100 for execution by one or more computing devices in accordance with the present invention. The method 1100 operates in step 1110 by detecting a total number of errors that is associated with a set of memory devices of one or more sets of storage units (SUs) within a dispersed or distributed storage network (DSN) that distributedly store a set of encoded data slices (EDSs). A data object is segmented into a plurality of data segments, and a data segment of the plurality of data segments is dispersed error encoded in accordance with dispersed error encoding parameters to produce the set of encoded data slices (EDSs).

When the total number of errors compares favorably to a priority error threshold level (step 1120), the method 1100 end and/or loops back to one or more of the steps included within the method 1100.

When the total number of errors compares unfavorably to the priority error threshold level (step 1120), the method 1100 operates in step 1130 by indicating that a minimum number of error-free EDSs are available of the set of EDSs. The method 1100 then continues in step 1140 by selecting a mechanism for data retention process from a plurality of mechanisms for data retention process. The method 1100 then operates in step 1150 by executing (e.g., via an interface of the computing device that is configured to interface and communicate with a dispersed or distributed storage network (DSN)) the mechanism for data retention process that is selected from the plurality of mechanisms for data retention process.

This disclosure presents, among other things, various novel solutions that operates to perform last-resort operations to save at-risk data. For example, when the namespace ranges assigned to memory devices is known, and the failed/recovered state of each memory device is known, then a namespace health map can be generated as follows: initialize entire namespace range from first name to last name with a value equal to the width; and for each memory device (or storage unit (SU)) that has failed but not yet been rebuilt, decrement the value associated with the namespace range for which that memory device (or SU) is responsible for by 1.

This results in a complete picture of how many slices are expected to be available and how many are expected to be missing for any particular name within the namespace, it also enables a list of "least healthy ranges" to be generated which correspond to those overlapping ranges that include the greatest number of unrecovered failures.

In an erasure code system, data becomes permanently unrecoverable when there are more than (Width-Threshold) slice failures for a given source. As a precaution, a DSN may implement "Last-Resort" operations to recover the reliability for data determined to be at a very high risk. For example, when the probability of data loss times the cost of losing data in a given range exceeds the cost of taking last-resort operations against data in that range plus the probability of losing data after performing those operations times the cost of losing data in that range, then it becomes economical to perform the last resort operations. These operations may include temporary width expansion, creating temporary replicas of the data, suspending regular IO operations to accelerate rebuilding, and other such extraordinary measures.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
    an interface configured to interface and communicate with a dispersed or distributed storage network (DSN);
    memory that stores operational instructions; and
    processing circuitry operably coupled to the interface and to the memory, wherein the processing circuitry is configured to execute the operational instructions to:
        receive, via the interface, memory device information and encoded data slice (EDS) information from at least some storage units (SUs) within the DSN that distributedly store a set of EDSs;
        process the memory device information and the EDS information to determine a total number of errors associated with the at least some SUs; and
        based on an unfavorable comparison of the total number of errors with the at least some SUs to a priority error threshold level, initiate a corresponding priority data retention process for the set of EDSs.

2. The computing device of claim 1, wherein the total number of errors associated with the at least some SUs includes at least one of a memory error associated with a memory device of an SU of the at least some SUs within the DSN that distributedly store the set of EDSs or a slice error associated with storage of an EDS of the set of EDSs that is distributedly stored in the at least some SUs within the DSN.

3. The computing device of claim 1, wherein the processing circuitry is further configured to execute the operational instructions to:
    initiate the corresponding priority data retention process for the set of EDSs by:
        selecting a mechanism for the corresponding priority data retention process for the set of EDSs from a plurality of mechanisms for priority data retention process; and
        executing the mechanism for corresponding priority data retention process for the set of EDSs that is selected from the plurality of mechanisms for priority data retention process.

4. The computing device of claim 3, wherein the processing circuitry is further configured to execute the operational instructions to:
    selecting the mechanism for the corresponding priority data retention process for the set of EDSs based on at least one of a number of available EDSs, a data type indicator, a data priority indicator, a data owner identifier, a predetermination, a request, or an interpretation of a portion of a system registry.

5. The computing device of claim 3, wherein the plurality of mechanisms for priority data retention process includes at least one of:
    a first mechanism that includes recovering a data segment that is associated with a data object, encoding the data segment in accordance with dispersed error encoding parameters to produce additional EDSs associated with the data object, and storing the additional EDSs within the one or more sets of SUs within the DSN;
    a second mechanism that includes recovering the data segment, rebuilding at least one EDS associated with a slice error to generate a rebuilt EDS, and storing the rebuilt EDS within the one or more sets of SUs within the DSN;
    a third mechanism that includes recovering the data segment, encoding the data segment in accordance with the dispersed error encoding parameters to produce to produce a copy of the set of EDSs, and storing the copy of the set of EDSs in another set of SU of the one or more sets of SUs within the DSN;
    a fourth mechanism that includes recovering EDSs associated with slice errors from another set of SUs, and storing another copy of the set of EDS within the one or more sets of SUs within the DSN; and
    a fifth mechanism that includes temporarily suspending access to a memory device of an SU of the at least some SUs within the DSN and prioritizing rebuilding of EDSs within the set of EDSs associated with slice errors.

6. The computing device of claim 1, wherein:
    a data object is segmented into a plurality of data segments;
    a data segment of the plurality of data segments is dispersed error encoded in accordance with dispersed error encoding parameters to produce the set of EDSs; and
    a decode threshold number of EDSs are needed to recover the data segment.

7. The computing device of claim 6, wherein:
    a read threshold number of EDSs provides for reconstruction of the data segment;
    a write threshold number of EDSs provides for a successful transfer of the set of EDSs from a first at least one location in the DSN to a second at least one location in the DSN;
    the set of EDSs is of pillar width and includes a pillar number of EDSs;
    each of the decode threshold number, the read threshold number, and the write threshold number is less than the pillar number; and
    the write threshold number is greater than or equal to the read threshold number that is greater than or equal to the decode threshold number.

8. The computing device of claim 1, wherein the computing device is located at a first premises that is remotely located from a second premises of at least one SU of the one or more sets of SUs within the DSN.

9. The computing device of claim 1, wherein the computing device is a SU of the one or more sets of SUs within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A method for execution by a computing device, the method comprising:
    receiving, via an interface of the computing device that is configured to interface and communicate with a dispersed or distributed storage network (DSN), memory device information and encoded data slice (EDS) information from at least some storage units (SUs) within the DSN that distributedly store a set of EDSs;

processing the memory device information and the EDS information to determine a total number of errors associated with the at least some SUs; and based on an unfavorable comparison of the total number of errors with the at least some SUs to a priority error threshold level, initiating a corresponding priority data retention process for the set of EDSs.

12. The method of claim 11, wherein the total number of errors associated with the at least some SUs includes at least one of a memory error associated with a memory device of an SU of the at least some SUs within the DSN that distributedly store the set of EDSs or a slice error associated with storage of an EDS of the set of EDSs that is distributedly stored in the at least some SUs within the DSN.

13. The method of claim 11 further comprising initiating the corresponding priority data retention process for the set of EDSs by:

selecting a mechanism for the corresponding priority data retention process for the set of EDSs from a plurality of mechanisms for priority data retention process; and executing the mechanism for corresponding priority data retention process for the set of EDSs that is selected from the plurality of mechanisms for priority data retention process.

14. The method of claim 13 further comprising:

selecting the mechanism for the corresponding priority data retention process for the set of EDSs based on at least one of a number of available EDSs, a data type indicator, a data priority indicator, a data owner identifier, a predetermination, a request, or an interpretation of a portion of a system registry.

15. The method of claim 13, wherein:

a first mechanism that includes recovering a data segment that is associated with a data object, encoding the data segment in accordance with dispersed error encoding parameters to produce additional EDSs associated with the data object, and storing the additional EDSs within the one or more sets of SUs within the DSN;

a second mechanism that includes recovering the data segment, rebuilding at least one EDS associated with a slice error to generate a rebuilt EDS, and storing the rebuilt EDS within the one or more sets of SUs within the DSN;

a third mechanism that includes recovering the data segment, encoding the data segment in accordance with the dispersed error encoding parameters to produce to produce a copy of the set of EDSs, and storing the copy of the set of EDSs in another set of SU of the one or more sets of SUs within the DSN;

a fourth mechanism that includes recovering EDSs associated with slice errors from another set of SUs, and storing another copy of the set of EDS within the one or more sets of SUs within the DSN; and a fifth mechanism that includes temporarily suspending access to a memory device of an SU of the at least some SUs within the DSN and prioritizing rebuilding of EDSs within the set of EDSs associated with slice errors.

16. The method of claim 11, wherein:

a data object is segmented into a plurality of data segments;

a data segment of the plurality of data segments is dispersed error encoded in accordance with dispersed error encoding parameters to produce the set of EDSs; and a decode threshold number of EDSs are needed to recover the data segment.

17. The method of claim 16, wherein:

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

18. The method of claim 11, wherein the computing device is located at a first premises that is remotely located from a second premises of at least one SU of the one or more sets of SUs within the DSN.

19. The method of claim 11, wherein the computing device is a SU of the one or more sets of SUs within the DSN, a wireless smart phone, a laptop, a tablet, a personal computers (PC), a work station, or a video game device.

20. The method of claim 11, wherein the DSN includes at least one of a wireless communication system, a wire lined communication system, a non-public intranet system, a public internet system, a local area network (LAN), or a wide area network (WAN).

* * * * *